Aug. 27, 1968  A. L. FREEDLANDER ET AL  3,398,517
LAWNMOWER BLADE
Filed July 21, 1967
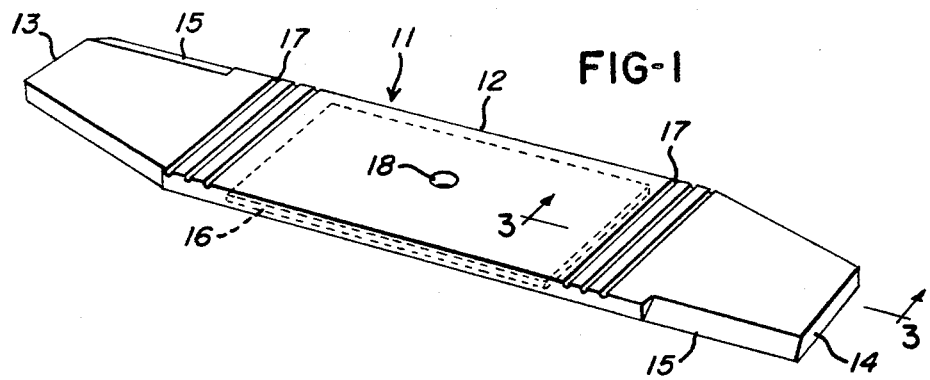
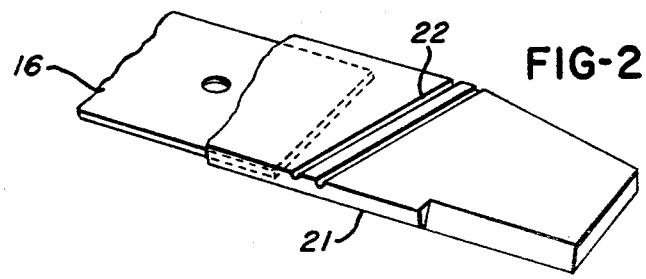
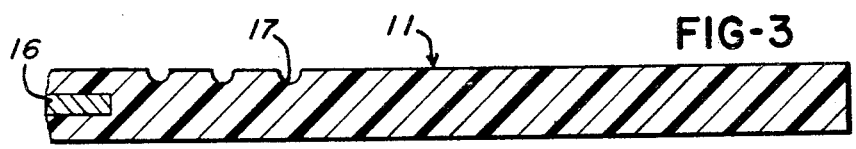
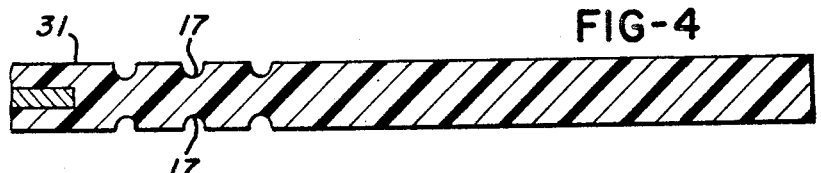
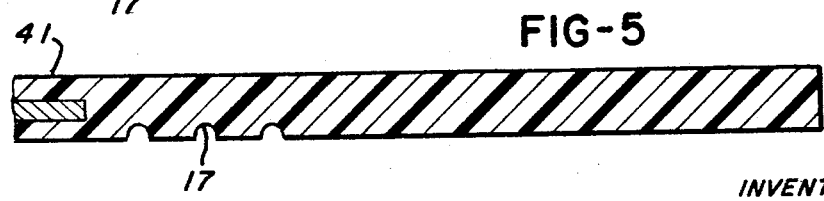
INVENTORS
ABRAHAM L. FREEDLANDER
WAYNE C. GARRETT
ROBERT E. MATTHEWS
BY
Reuben Wolk
ATTORNEY

United States Patent Office 3,398,517
Patented Aug. 27, 1968

3,398,517
LAWNMOWER BLADE
Abraham L. Freedlander, Dayton, Ohio, and Wayne C. Garrett and Robert E. Matthews, Waynesville, N.C., assignors to Dayco Corporation, Dayton, Ohio, a corporation of Delaware
Filed July 21, 1967, Ser. No. 655,195
The portion of the term of the patent subsequent to Sept. 26, 1984, has been disclaimed
3 Claims. (Cl. 56—295)

ABSTRACT OF THE DISCLOSURE

A flexible elastomeric lawnmower blade having transverse grooves in the upper or lower surfaces (or both) of the arms.

Conventional lawnmowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc., the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our application Ser. No. 579,304, filed on Sept. 14, 1966, now United States Patent No. 3,343,350, we have described an invention relating to a blade formed of a non-reinforced homogeneous flexible elastomeric material. The present invention relates to a somewhat different form of this blade, having additional properties of flexibility. This may be necessary because in certain types of lawns the grass may not be as stiff and resistant to cutting, and may therefore permit a more flexible blade and thus provide a further margin of safety when striking a foreign object. This additional flexibility is accomplished by providing grooves in the upper or lower surface of the blade arms, in a generally transverse direction; this permits the portions of the arms outward of the grooves to lift up over the shoe, rock, or other foreign object which is struck.

The invention will be more fully understood by referring to the following description and drawing, in which:

FIGURE 1 is a perspective view of a novel blade in accordance with the invention.

FIGURE 2 is a perspective view of a portion of a modified form of blade.

FIGURE 3 is a cross section of the blade taken along line 3—3 of FIGURE 1.

FIGURES 4 and 5 are views siimlar to FIGURE 3 illustrating modified forms of the invention.

Referring now to the drawing, FIGURE 1 illustrates the novel lawnmower blade 11 which is generally rectangular in shape and has a central portion 12 having its maximum width at the region of the center, having outwardly extending arms 13 and 14 tapering inwardly to the outer edges thereof. The principal body of which this blade is formed is an elastomer, preferably a urethane elastomer of the type more fully described in the above-referenced patent application. As indicated above, the material provides a cutting member and yet has the necessary flexibility to minimize injuries. The outermost edge portions of the blade are beveled to provide cutting edges 15. Although it is possible to made the blade entirely of the elastomeric material, it may sometimes be desirable to provide additional rigidity in the central portion, and for this purpose a central stiffening member 16 may be incorporated within the body of the central portion as shown in the drawings. This member 16 may be made of metal or rigid plastic material. A mounting hole 18 extends through the center of the blade for the purpose of mounting the blade on the shaft of the lawnmower.

In order to provide additional flexibility for the purposes described above, a series of grooves 17 extends transversely of the blade in the upper surface thereof, and are located just outward of the reinforcing member 16. The exact number and size of the grooves may be varied in accordance with the desired design, and the specific location of these grooves may also be varied slightly from that which is shown. By means of these grooves the portions of the blade outwardly thereof are rendered more flexible so that when the blade strikes a rock or shoe it will tend to flex up and ride over this object.

FIGURE 2 illustrates a modified form of the invention in which a blade 21 has grooves 22 which extend in a generally transverse direction of the blade but are slightly more angled than the grooves illustrated in FIGURE 1. These grooves also may vary in number, size, or specific location.

It is noted that in FIGURE 3 the grooves 17 are illustrated as being located in the upper surface only of the blade. However, the flexibility of the blade may be varied by providing these grooves in both upper and lower surfaces of the blade 31 illustrated in FIGURE 4, or by providing the grooves in the lower surface only of the blade 41 as shown in FIGURE 5. In every case the grooves may be either transverse as shown in FIGURE 1, or at some generally transverse angle such as in FIGURE 2. Whichever specific arrangement is used, additional flexibility is provided to the outermost portions of the blade.

Other modifications are contemplated as falling within the scope of the invention.

We claim:

1. In a lawnmower blade having a rotatable shaft, a cutting blade mounted on said shaft principally composed of a flexible urethane elastomer, and having outwardly extending arms with cutting edges and non-cutting surfaces, said arms having grooves in at least one non-cutting surface, said grooves extending in a generally transverse direction to said arms.

2. The blade of claim 1 in which said grooves are located in both upper and lower surfaces.

3. The blade of claim 1 in which said blade has a rigid central mounting portion.

References Cited

UNITED STATES PATENTS

| | | | |
|---|---|---|---|
| 2,759,318 | 8/1956 | Oppel | 56—26 X |
| 2,837,887 | 6/1958 | Hansen | 56—295 |
| 3,320,732 | 5/1967 | Kirk | 56—295 |
| 3,343,350 | 9/1967 | Freedlander et al. | 56—295 |
| 3,343,351 | 9/1967 | Freedlander et al. | 56—295 |
| 3,156,082 | 11/1964 | Joyner | 56—295 |

ABRAHAM G. STONE, *Primary Examiner.*

P. A. RAZZANO, *Assistant Examiner.*